Aug. 1, 1950  H. S. GOULD ET AL  2,516,979
PHOTOGRAPHIC DISPLAY MECHANISM
Filed Oct. 2, 1946  3 Sheets-Sheet 1

INVENTORS.
Howard S. Gould,
Joseph F. Beck,
Dana C. Manning.
BY Elmer Jamison Gray
ATTORNEY.

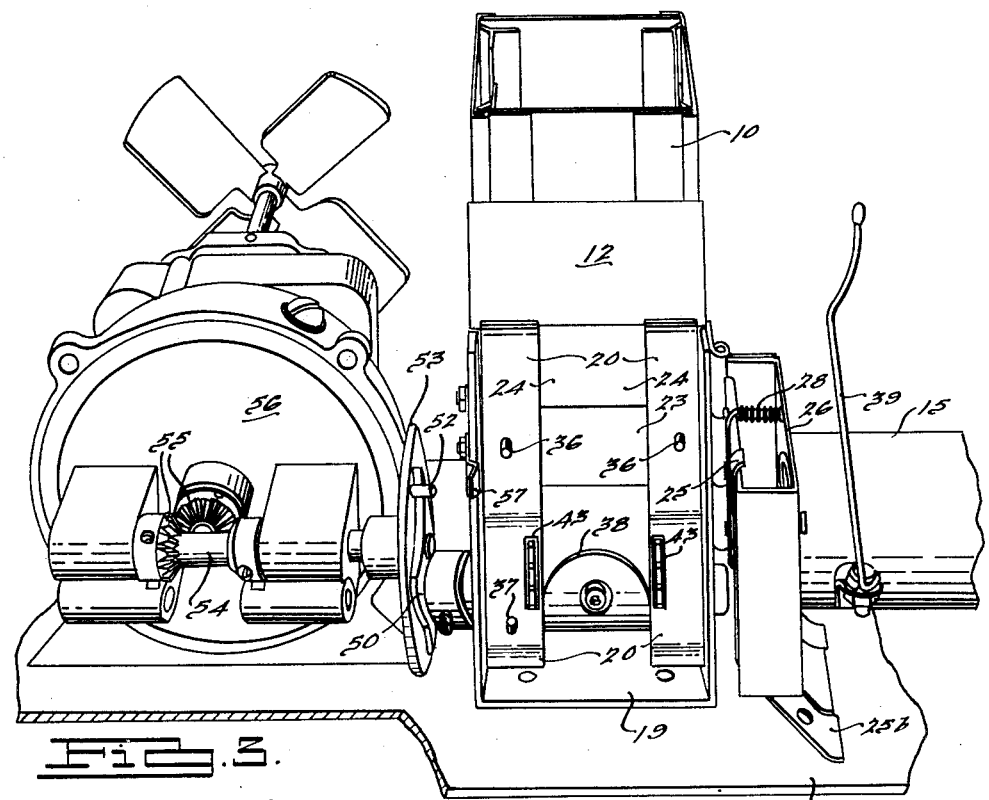

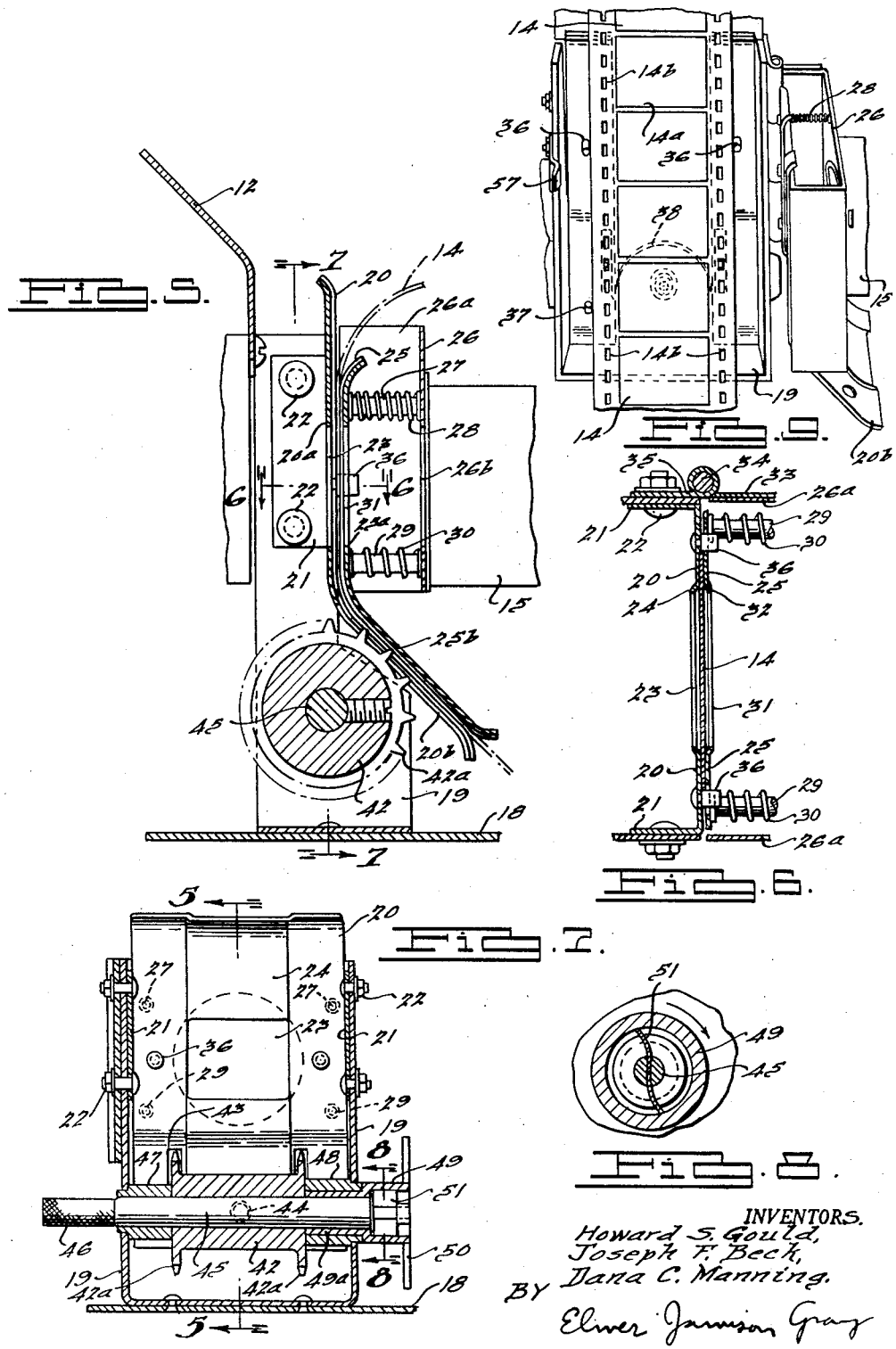

Patented Aug. 1, 1950

2,516,979

UNITED STATES PATENT OFFICE 2,516,979

PHOTOGRAPHIC DISPLAY MECHANISM

Howard S. Gould, Joseph F. Beck, and Dana C. Manning, Detroit, Mich., assignors to The Jam Handy Organization, Inc., Detroit, Mich., a corporation of Delaware Application October 2, 1946, Serial No. 700,610

4 Claims. (Cl. 88—28)

This invention relates to slide film projectors and more particularly to improvements in projectors of this class capable of being advantageously used for continuous operation in connection with a length of slide film formed into a continuous loop.

An important object of the invention is to provide a slide film projector useful in connection with a continuous film loop and wherein provision is made for guiding, supporting and yieldingly holding the film in improved manner during operation whereby the danger of damage to the film and marring thereof is greatly reduced and minimized, resulting in appreciably prolonging the life and usefulness of the film.

Heretofore, serious problems have been encountered where attempts have been made to use conventional slide film projectors for continuous operation in connection with continuous film loops. Such projectors are designed for use with film strips which, not being in the form of loops, pass in a straight line path through the projector. Where used in such manner the guiding action of the sprocket teeth is ordinarily sufficient to locate the lower portion of the film below the film aperture in proper position with respect thereto.

However, in the use of a continuous film loop the film does not pass through the projector in a straight line path, but instead must be offset or guided laterally in front of the projector in order to be clear of the lens and not to obstruct the same. This necessitates a lateral feeding motion of the film as it leaves the projector below the film gate. As a result, the force needed to pull the film through the projector creates a twisting action on the film tending to pull the film away from the sprocket teeth and cause it to climb or ride on top of the teeth. When this occurs the teeth cut the edges of the sprocket holes in the film, eventually damaging the film beyond usefulness.

In conventional slide film projectors the film is held in the focal plane of the lens by means of glass pressure plates which rigidly engage and grip opposite faces of the film during the interval when the film is stationary and a picture thereon is being projected. These glass pressure plates are intended to be separated when the film is being fed from one frame to another. However, since retraction or separation of the pressure plates is accomplished through mechanism controlled from or timed with the motion of the sprocket shaft, a certain amount of feeding motion of the film invariably occurs before the pressure plates release their grip on the film, thus resulting in marring or scratching the film.

The use of the glass pressure plates is particularly objectionable where the projector is used with a continuous film loop which contains a double thickness splice where the ends of the film strip are overlapped and united to produce the loop. Mechanically actuated or rigidly mounted pressure plates, designed to accommodate a single film thickness, produce objectionable binding when a double thickness splice is fed therebetween.

An object, therefore, of the present invention is to overcome the foregoing disadvantages and difficulties and to provide an improved continuously operable slide film projector equipped with improved pressure plates or members adapted yieldingly to hold the film in proper position while at the same time being constructed so as to preclude any possibility of the picture areas of the film becoming marred or scratched during the feeding operation or the edges of the film becoming punctured by the sprocket teeth when the pressure plates are brought into closed relation after loading the projector.

Another object is to provide an improved projector having pressure plates coacting only with the edges of the film outside the picture areas and wherein the outer pressure plate is yieldingly mounted so as to permit proper feeding motion of the film while also serving to hold the film below the film gate against outward displacement relative to the sprocket teeth consequent to the angular or lateral pull exerted thereon after the film leaves the projector.

A further object of the invention is to provide improved means coacting with the edges of the slide film for guiding that portion of the film loop which lies in engagement with the pressure plates during the passage of the film through the projector, this guiding means being so constructed and arranged as to hold the film against lateral displacement and also to facilitate loading the film loop in the projector so that damage to the film will be avoided when the projector is closed and the pressure plates engaged with the film.

Still another object of the invention is to provide a pair of relatively yieldable pressure plates together with edge guiding pins on the fixed or bottom pressure plate effective in cooperation to enable quick and easy loading of the projector by unskilled or untrained persons without, however, introducing any appreciable danger of the film becoming damaged when the projector is closed and the film shifted longitudinally by the operator to engage the sprocket teeth with the sprocket holes at the edges of the film.

Other objects of this invention will appear in the following description and appended claims, reference being had to the accompanying drawings forming a part of this specification wherein like reference characters designate corresponding parts in the several views.

Fig. 3 is a perspective view illustrating in elevation the front of the projector in open position with the film loop removed.

Fig. 4 is a perspective view taken at an angle from the righthand side of the projector with the latter in open position and the film loop removed.

Fig. 5 is an enlarged section taken substantially through lines 5—5 of Fig. 7 looking in the direction of the arrows.

Fig. 6 is an enlarged section taken substantially through lines 6—6 of Fig. 5 looking in the direction of the arrows.

Fig. 7 is a vertical section, on a reduced scale, taken substantially through lines 7—7 of Fig. 5 looking in the direction of the arrows.

Fig. 8 is an enlarged section taken substantially through lines 8—8 of Fig. 7 looking in the direction of the arrows.

Fig. 9 is a fragmentary view, in part similar to Fig. 3, illustrating the position of the film with respect to the back pressure plate.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
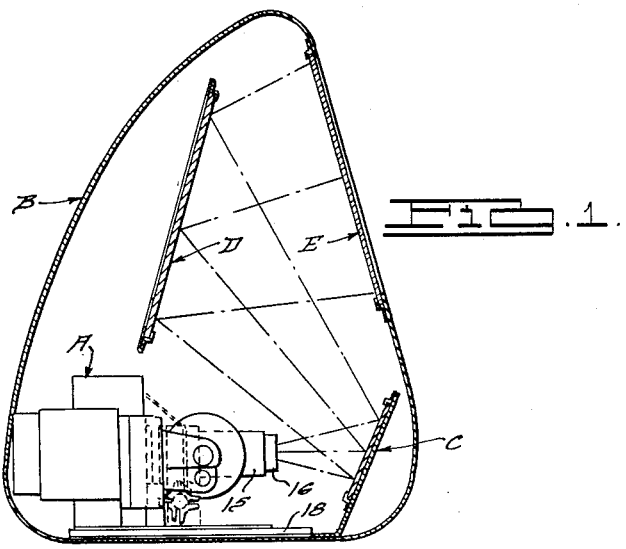
Fig. 1 is a vertical sectional view taken through a slide film projector casing or cabinet having mounted therein in operative position a projector mechanism constructed in accordance with the present invention.

In the drawings there is illustrated, by way of example, a continuous slide film projector constructed in accordance with one embodiment of the present invention. The projector mechanism as a unit, indicated generally at A in Fig. 1, is preferably mounted within a suitable cabinet or casing B for use in displaying pictures depicted on a length of slide film formed into a continuous loop. The pictures on the film are successively projected onto a lower mirror C within the cabinet. This mirror is angularly positioned with respect to the axis of the projection lens so as to direct the light rays onto an upper angularly positioned mirror D by which the pictures are projected onto a translucent screen E arranged in an opening at the front of the cabinet.

The projector proper comprises in general a conventional lamp housing 10 containing an electric lamp bulb which provides a source of light of the desired density, the light rays therefrom passing through a front aperture in the lamp housing and thence through condenser lens mounted in a casing 11 secured to the lamp housing. In front of the condenser lens assembly is arranged a light shield 12 and a combined film gate and guide structure, generally indicated at 13, and later described in detail. Communicating with the film aperture in this structure is a split lens supporting tube 15 within which is telescoped a lens holder 16 which is longitudinally adjustable in the tube 15 and clamped in adjusted position in conventional manner by means of a clamping knob 17.

The projector mechanism is mounted as a unit upon a base plate 18 and rigidly secured to this base plate is a U-shaped bracket 19 having upstanding spaced sides. Extending between the upright sides of the bracket 19 is a fixed pressure plate 20 provided with rearwardly extending attaching flanges 21 secured by means of bolts and nuts 22 to the upright sides of the bracket 19. As clearly shown in Fig. 5, the fixed pressure plate 20 is angularly formed to provide a vertically extending portion 20a formed centrally thereof with a light aperture 23 and also to provide a lower portion 20b which is inclined downwardly and forwardly. This pressure plate is channeled centrally throughout its length to provide a depressed or relieved portion 24 lying in a plane somewhat rearwardly of the plane of the remaining marginal portions of the pressure plate, the width of the channel or relieved portion 24 corresponding, as later described, substantially to the width of the picture frames on the film strip 14.

Cooperating with the fixed or back pressure plate 20 is a yieldable pressure plate 25, the upper edge of which terminates somewhat short of the upper edge of the pressure plate 20. When the projector is closed the yieldable pressure plate 25 extends contiguously with and parallel to the pressure plate 20 and, hence, is correspondingly shaped throughout the major length thereof. Thus, the front pressure plate 25 has a vertically extending portion 25a extending parallel with the portion 20a of the back pressure plate and also has a forwardly inclined portion 25b extending parallel to the portion 20b of the back pressure plate. The yieldable pressure plate 25 extends between the spaced side flanges 26a of a swinging gate or closure member 26 which is provided centrally thereof with a light aperture 26b. Secured to the upper end of the yieldable pressure plate 25 are two laterally spaced pins 27 upon which are mounted compression springs 28. Secured to the lower end of the vertical portion 25a of the pressure plate 25 are a pair of pins 29 upon which are mounted compression springs 30. The pairs of upper and lower spring supporting pins 27 and 29 are guided at their outer ends in holes in the gate member 26 and, hence, the springs are confined under compression between the pressure plate 25 and the gate 26. By virtue of this construction it will be seen that the pressure plate 25 is yieldingly mounted on the gate 26 and is capable of limited longitudinal movement fore and aft against the action of the upper and lower pairs of springs 28 and 30. The pressure plate 25 is provided centrally thereof with a light aperture 31 adapted to register with the light aperture 23 when the projector is closed. Furthermore, the pressure plate 25 is formed with a central longitudinal channel 32 extending the full length thereof and corresponding to the channel 24 except reversely formed. Thus, when the gate 26 is closed, as shown in Figs. 5 and 6, the channel or relieved portions 24 and 32 register with each other and provide a clearance space through which the picture or frame portion of the film passes without contact with either pressure plate. However, when the pressure plates are in closed relation the marginal edge portions thereof at opposite sides of the channels, as shown in Fig. 6, will engage the edges of the film outside the picture area and this engagement will be of a yielding nature in accordance with the pressure exerted by the springs 28 and 30 on the front pressure plate 25.

Secured to one of the flanges 26a of the gate member 26 is a hinge plate 33 which is hingedly connected by means of a pintle pin 34 to a hinge plate 35 attached by means of bolts 22 to the bracket 19. By this construction the gate member 26, which carries the yieldable pressure plate 25, may be swung out outwardly with respect to the pressure plate 20 in order to load the film in the projector or remove it therefrom. The lens supporting tube 15 is rigidly attached to the front side of the gate 26 in line with the light aperture 26b.

For the purpose of positioning and guiding the film 14 through the projector a series of three guide pins are provided and arranged on the fixed pressure plate 20 so as to engage the edges of the film. A pair of laterally spaced guide pins 36 are mounted on the pressure plate 20 at opposite sides of the light aperture 23 therein. Below one of the guide pins 36 is arranged a third guide pin 37. Since the film, as it emerges from the lower ends of the pressure plates, is guided to the left, as viewed in Fig. 3, in order to clear the front end of the lens holder 16, the lower guide pin 37 is positioned at the left-hand side of the pressure plate 20 so as to resist any tendency of the film to become displaced laterally by reason of the twisting action thereon when it is fed to the side of the lens holder. When the gate 26 is closed the guide pins 36 and 37 project into holes 25c in the yieldable pressure plate.

The lower end of the channel portion 24 in the fixed pressure plate 20 is cut away at 38 a substantial distance above the lower end of the pressure plate so as to prevent engagement of the picture area with the lower part of the pressure plate due to the tendency of the film to bow inwardly when it is fed laterally from the lower ends of the pressure plates. In order to direct the path of the film laterally away from the outer end of the lens holder 16 after the film passes out of the projector, suitable wire guides 39, 40 and 41 are mounted on the lens tube 15 as in the manner shown in Fig. 2. These wire guides function not only to maintain the film loop to one side of the lens tube but also to guide the film into proper position between the upper ends of the pressure plates as the film returns to the projector during the feeding motion thereof. Passage of the film between the pressure plates as it enters and leaves the projector is facilitated by flaring the upper and lower ends of the pressure plates in the manner shown in Fig. 5.

The film loop 14 is fed step by step through the projector by means of a sprocket 42 having spaced peripheral teeth 42a meshing in sprocket holes 14b formed along opposite edges of the film. The teeth of the sprocket 42 project through slots 43 in the fixed pressure plate 20 and the sprocket is pinned at 44 to a cross-shaft 45 terminating at one end in a knurled framing knob 46 accessible at one outer side of the bracket 19. The shaft 45 is supported by bushings 47 and 48 carried by the bracket 19 and the end of the shaft opposite to the framing knob 46 is journalled within a reduced portion 49a of a driving sleeve 49 to the outer end of which is secured one member 50 of a conventional Geneva drive mechanism. Motion from the driving sleeve 49 is transmitted to the sprocket shaft 45 by means of a spring clutch device which comprises a flat spring or spring leaf 51 passing through and anchored within a slot in the end of the shaft 45, this spring being bent at opposite ends and in opposite directions into approximately S-shape. The ends of the spring 51 firmly engage against the bore of the sleeve 49 and are at all times held thereagainst under tension. As a result of this construction, when the sleeve 49 is rotated by the Geneva mechanism in the direction of the arrow in Fig. 8, the sleeve will be rigidly clutched through the medium of the spring 51 to the shaft 45, thereby positively coupling the sleeve to the shaft. If, however, the shaft 45 is manually turned by the framing knob 46 in the direction of the arrow in Fig. 8, the shaft and the spring 51 will turn freely relatively to the sleeve 49, and hence by means of the framing knob 46 the longitudinal position of the film with relation to the various light apertures may be adjusted independently of the drive mechanism.

The element 50 of the Geneva mechanism is driven by means of pins 52 on a driving plate 53 secured to the end of a shaft 54 which in turn is driven through the medium of bevel gears 55 from the armature shaft of an electric motor 56.

Figure 2:
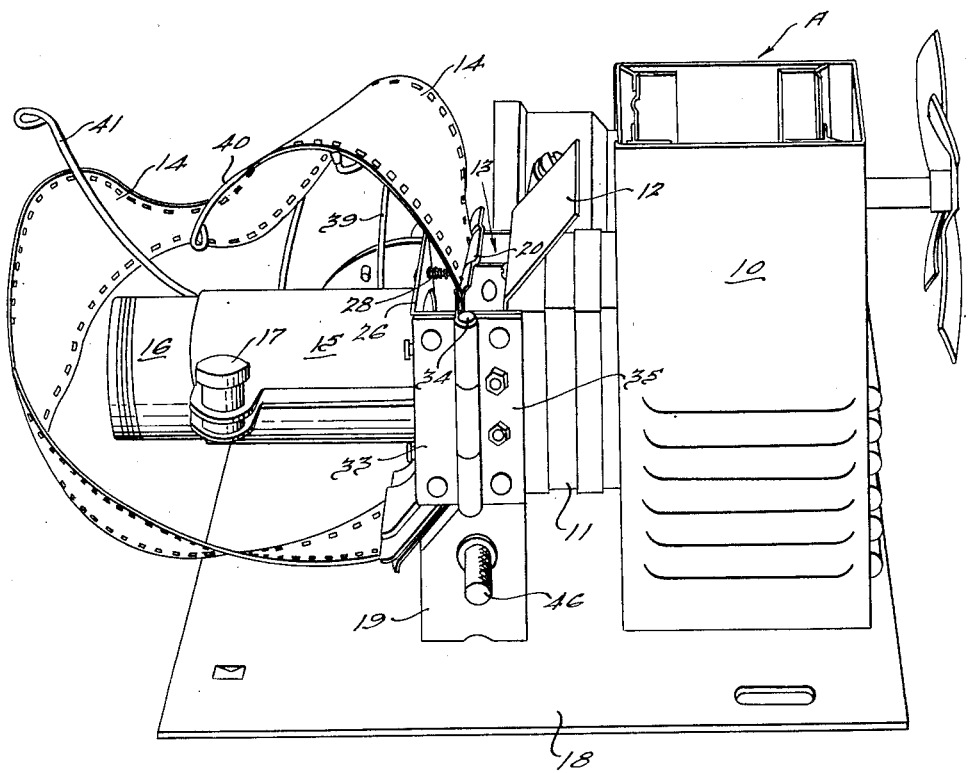
Fig. 2 is a perspective view illustrating in elevation the lefthand side of the projector with a continuous film loaded therein and the projector closed for operation.

When the film loop is loaded into the projector or removed therefrom, the projector is opened by swinging the gate member 26 horizontally to the portion shown in Figs. 3, 4 and 9. When closed the gate member is held in position as shown in Figs. 2 and 5 by means of a spring catch 57.

It is important to note from the foregoing that the edge guiding pins 36 and 37 for the film will maintain the film in such position between the pressure plates as to cause the picture frames or areas 14a (Fig. 9) to lie at all times entirely within the relieved or channel portions 24, 32 of the pressure plates. Hence, the pressure plates only contact the film strip outside the picture areas and the latter are at all times out of contact with any part of the projector. Since the front pressure plate is yieldable against the action of springs 28 and 30 it is possible for the double thickness spliced portion of the film loop to pass between the pressure plates without binding while at all times maintaining the single thickness of the film yieldingly pressed against the rear pressure plate.

On account of forces acting on the film as it passes over the driving sprocket and thence outwardly from the lower ends of the pressure plates, there is a tendency for the film to climb off the sprocket teeth, resulting in causing the teeth to cut the edges of the sprocket holes in the film. This is obviated in accordance with the present invention by making the lower springs 30, acting on the front pressure plate 25, appreciably stronger or stiffer than the upper springs 28. The greater strength of the lower springs, although not great enough to cause excessive pressure on the edges of the film or prevent the passage between the pressure plates of the film splice, is preferably such as to maintain the film in proper meshing relation to the sprocket teeth.

It will be apparent that the comparative strength of the upper and lower pairs of springs may vary considerably in practice. However, satisfactory results have been achieved by making the lower springs 28 approximately twice as strong or stiff as the upper springs.

As compared with previous practice, where the film strip is fed between rigid or fixed pressure plates, it is possible by virtue of the present invention to load the film loop into the projector without danger of any damage to the film. It is merely necessary to open the gate member 26, as in Figs. 3, 4 and 9, place the film loop in position against the rear pressure plate between the guide pins 36 and 37, then close the gate and shift the film vertically until the sprocket holes 14b engage with the sprocket teeth 42a. Since the front pressure plate is yieldable against its springs 28 and 30, it will not press the edges of the film against the teeth of the sprocket, when the projector is closed, with sufficient force to cause the teeth to puncture the film in the event the teeth are not initially aligned with the sprocket holes. This important feature of the invention permits a strip of film to be easily loaded into the projector by inexperienced persons without any appreciable danger of damage to the film, since it is not necessary to have the sprocket teeth lined up with the sprocket holes in the film when the gate 26 is closed.

We claim:

1. In a slide film projector, film guiding means including a pair of front and rear upright pressure plates having vertical portions terminating at their lower ends in bends and having downwardly and forwardly inclined portions below said bends, extending angularly with respect to said vertical portions; said pressure plates having edge areas adapted to contact opposite faces of the film strip outside the picture areas thereof and being relatively relieved intermediate said edge areas to free the pressure plates from contact with said picture areas as the film is fed vertically between the plates, means for yieldingly mounting one of said pressure plates for longitudinal movement relative to the other, vertically spaced guide pins on said vertical and inclined portions of the rear pressure plate adapted to engage opposite edges of the film strip, and a film advancing sprocket having teeth projecting through slots in said inclined portion of the rear pressure plate and adapted to engage in sprocket holes in the film strip.

2. In a slide film projector, film guiding means including a pair of front and rear upright pressure plates having vertical portions terminating at their lower ends in bends and having downwardly and forwardly inclined portions below said bends extending angularly with respect to said vertical portions, said pressure plates having edge areas adapted to contact opposite faces of the film strip outside the picture areas thereof and being relatively relieved intermediate said edge areas to free the pressure plates from contact with said picture areas as the film is fed vertically between the plates, means for yieldingly mounting one of said pressure plates for longitudinal movement relative to the other, a film advancing sprocket having teeth projecting through slots in said inclined portion of the rear pressure plate and adapted to engage in sprocket holes in the film strip, laterally spaced guide pins on the vertical portion of the rear pressure plate engageable with the edges of the film strip, and a guide pin on the inclined portion of the rear pressure plate below said slots engageable with an edge of the film strip.

3. In a film projector, a housing support, a rear pressure plate mounted thereon, a lense carrying gate member hinged to the support, a front pressure plate mounted on said gate member; said pressure plates having vertical portions merging into downwardly and forwardly inclined portions extending angularly with respect to said vertical portions thereby to bend the film as it is fed between said plates, spring means for yieldingly mounting one of the pressure plates; said front pressure plate and gate member adapted to swing horizontally and laterally to expose the front of said rear pressure plate, and means carried by said gate member for guiding the film laterally and positioning it to one side of the lens after it emerges from the lower ends of said inclined portions.

4. In a film projector for use with a continuous loop film, film guiding means including a pair of front and rear upright pressure plates having vertical portions terminating at their lower ends in downwardly and forwardly inclined portions extending angularly with respect to said vertical portions thereby to bend the film as it is fed between said plates, a horizontally swinging lens carrying gate, means for mounting the front pressure plate on said gate for longitudinal yielding movement, film edge guiding means on said vertical and inclined portions of said rear pressure plate, and film guide means carried by said swinging gate for guiding the film laterally and positioning it to one side of the lens after it emerges from the lower ends of said inclined portions.

HOWARD S. GOULD.
JOSEPH F. BECK.
DANA C. MANNING.

REFERENCES CITED

The following references are of record in the file of this patent:

UNITED STATES PATENTS

| Number | Name | Date |
|---|---|---|
| 1,128,841 | Bohringer | Feb. 16, 1915 |
| 1,256,613 | Terwilliger | Feb. 19, 1918 |
| 1,738,762 | De Vault | Dec. 10, 1929 |
| 1,780,945 | Sapier | Nov. 11, 1930 |
| 1,815,486 | Serrurier | July 21, 1931 |
| 1,827,101 | Patterson | Oct. 13, 1931 |
| 1,933,066 | Merle | Oct. 31, 1931 |
| 2,428,458 | Sundgren et al. | Oct. 14, 1947 |

FOREIGN PATENTS

| Number | Country | Date |
|---|---|---|
| 9,864 | Great Britain | Apr. 26, 1909 |